United States Patent

Sicken et al.

Patent Number: 5,326,805
Date of Patent: Jul. 5, 1994

[54] FLAME-RETARDANT PLASTICS MOLDING COMPOSITION OF IMPROVED STABILITY

[75] Inventors: Martin Sicken, Cologne; Wolfgang Wanzke, Gersthofen, both of Fed. Rep. of Germany

[73] Assignee: Hoechst Aktiengesellschaft, Frankfurt am Main, Fed. Rep. of Germany

[21] Appl. No.: 100,909

[22] Filed: Jul. 30, 1993

[30] Foreign Application Priority Data

Aug. 1, 1992 [DE] Fed. Rep. of Germany ....... 4225477

[51] Int. Cl.⁵ ..................... C08K 5/3492; C08K 3/28
[52] U.S. Cl. ..................... 524/101; 524/416
[58] Field of Search ................. 524/416, 101

[56] References Cited
U.S. PATENT DOCUMENTS 5,210,120 5/1993 Cipolli et al. ............... 524/416

Primary Examiner—Kriellion S. Morgan

[57] ABSTRACT

A flame-retardant plastic molding composition of improved stability comprises 50 to 85% by weight, based on the total amount of the molding composition, of an olefin polymer and 15 to 50% by weight, based on the total amount of the molding composition, of a flameproofing system comprising 80 to 50% by weight of an ammonium polyphosphate of the formula $(NH_4PO_3)_n$, in which n is a number from 200 to 1000 (=component A) and 50 to 20% by weight of a reaction product of tris(2-hydroxyethyl) isocyanurate (THEIC) of the formula

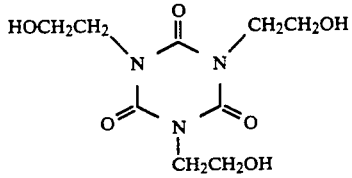

with an aromatic polycarboxylic acid of the formula $$Ar(COOH)_m$$

(=component B).

As a result of the flameproofing system to be employed according to the invention, not only is the processing temperature of the plastics molding composition increased, but the water-solubility of components of the molding composition after processing is reduced significantly. Furthermore, the components of plastic provided with a flame-retardant treatment show a reduced tendency to "exude" constituents of the flameproofing system.

15 Claims, No Drawings

FLAME-RETARDANT PLASTICS MOLDING COMPOSITION OF IMPROVED STABILITY

The invention relates to a flame-retardant plastics molding composition which comprises an intumescence flameproofing system based on ammonium polyphosphate (APP) and, by the selection of suitable additives (synergists) has a higher processing stability than the previously known molding compositions comprising intumescence systems based on ammonium polyphosphate, does not lose the flameproofing action in contact with water, and has a reduced tendency to "exude" constituents of the flameproofing system during prolonged storage.

The use of an intumescence mixture for flame-retardant treatment of polyolefins in which a mixture of ammonium polyphosphate and tris(2-hydroxyethyl) isocyanurate is used together with melanine, pentaerythritol, tripentaerythritol or cyanuric acid is known (cf. U.S. Pat. No. 4,198,493).

It is furthermore known to use a combination of ammonium polyphosphate and the reaction product of an oxy-acid of phosphorus with a hydroxyalkyl derivative of isocyanuric acid (cf. 4 461 862).

Finally, self-extinguishing olefin polymers and copolymers which comprise ammonium polyphosphate and tris(2-hydroxyethyl) isocyanurate are known (cf. EP 258 685).

Although the mixtures described develop a good or at least adequate flameproofing effect, they still have various disadvantages, which have so far impeded large-scale industrial use in polyolefins.

Thus, the processing temperatures of the corresponding polymeric compositions have previously been limited to 200° to 250° C. by the intumescence mixtures, but the preferred range for injection molding processing of polypropylene is, for example, 250° to 270° C.

The water-solubility of the intumescence mixtures or of individual components is sometimes very high, so that the flameproofing effect of the polymeric compositions treated in this way is reduced relatively rapidly or eliminated completely in contact with water.

Furthermore, some of the flameproofing mixture may "exude" out of the polymeric composition, especially at elevated use temperatures, which limits the usefulness of the polymeric composition and also reduces the flame-proofing effect.

It has now been found that if certain aromatic carboxylic acid esters of tris(2-hydroxyethyl) isocyanurate are used as synergists to the polmeric ammonium phosphate, the abovementioned disadvantages can be avoided.

The invention thus relates to a flame-retardant plastics molding composition comprising
  50 to 85% by weight, based on the total amount of molding composition, of an olefin polymer and
  15 to 50% by weight, based on the total amount of the molding composition, of a flameproofing system comprising 80 to 50% by weight of an ammonium polyphosphate of the formula $(NH_4PO_3)_n$, in which n is a number from 200 to 1000 (=component A), and
  50 to 20% by weight of a compound (=component B) comprising
    a) units of the formula I

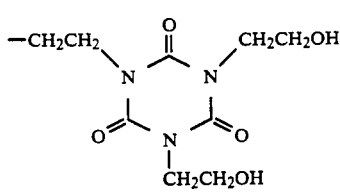

b) units of the formula II

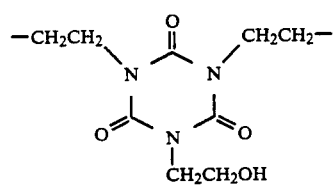

c) units of the formula III

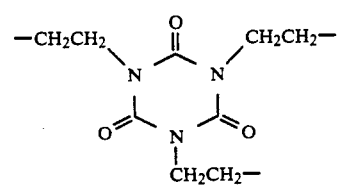

and
  d) units of the formula IV $$Ar(COO\text{-})_m \qquad (IV)$$

in which Ar is a mono-, di- or trinuclear aromatic six-membered ring system and m is 2, 3 or 4.

The flame-retardant polymeric molding composition according to the invention comprises 50 to 85, preferably 60 to 80% by weight of one of the polymers listed below:
1. Polymers of mono- and diolefins, for example polyethylene of high, medium or low density (which can optionally be crosslinked), polypropylene, polyisobutylene, polybut-1-ene, polymethylpent-1-ene, polyisoprene or polybutadiene, and polymers of cycloolefins, such as, for example, of cyclopentene or norbornene.
2. Mixtures of the polymers mentioned under 1), for example mixtures of polypropylene with polyethylene or with polyisobutylene.
3. Copolymers of mono- and diolefins with one another or with other vinyl monomers, such as, for example, ethylene/propylene copolymers, propylene/but-1-ene copolymers, propylene/isobutylene copolymers, ethylene/but-1-ene copolymers, propylene/butadiene copolymers, isobutylene/isoprene copolymers, ethylene-/alkyl acrylate copolymers, ethylene/alkyl methacrylate copolymers, ethylene/vinyl acetate copolymers or ethylene/acrylic acid copolymers and salts thereof (ionomers), and terpolymers of ethylene with propylene and a diene, such as hexadiene, dicyclopentadiene or ethylidenenorbornene
4. Polystyrene and poly(p-methylstyrene)
5. Copolymers of styrene or α-methylstyrene with dienes or acrylic derivatives, such as, for example, styrene/ butadiene, styrene/maleic anhydride, styrene/acrylonitrile, styrene/ethyl methacrylate, styrene/butadiene/ ethyl acrylate and styrene/acrylonitrile/methacrylate; high impact strength mixtures of styrene copolymers and another polymer, such as, for example, a polyacrylate, a diene polymer or an ethylene/propylene/diene terpolymer; and block copolymers of styrene, such as, for example, styrene/butadiene/styrene, styrene/isoprene/styrene, styrene/ethylene-butylene/styrene or styrene/ethylene-propylene/styrene.

6. Graft copolymers of styrene, such as, for example, styrene on polybutadiene, styrene and acrylonitrile on polybutadiene, styrene and maleic anhydride on polybutadiene, styrene and alkyl acrylates or alkyl methacrylates on polybutadiene, styrene and acrylonitrile on ethylene/ propylene/diene terpolymers, styrene and acrylonitrile on polyalkyl acrylates or polyalkyl methacrylates, and styrene and acrylonitrile on acrylate/butadiene copolymers, and mixtures thereof with the copolymers mentioned under 5), which are known, for example, as so-called ABS, MBS, ASA or AES polymers.

Preferred polymers are polyolefins, in particular polypropylene and polyethylene and ethylene/vinyl acetate copolymers.

The plastics molding composition according to the invention furthermore comprises 15 to 50% by weight of a flameproofing system which comprises two components (A and B).

Component A of this flameproofing system is an ammonium polyphosphate of the formula $(NH_4PO_3)_n$, in which n is a number from 200 to 1000, preferably about 700, which is a free-flowing powder which is sparingly soluble in water and can be covered with 0.5 to 25% by weight of a coating agent, preferably with a cured melamine/formaldehyde resin or a cured epoxy resin.

Component B of the flameproofing system is a reaction product of tris(2-hydroxyethyl) isocyanurate (THEIC) of the formula

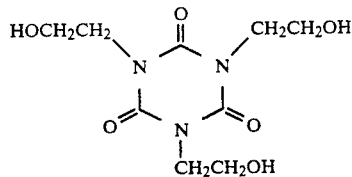

with an aromatic polycarboxylic acid of the formula

and is a mixture of monomeric and oligomeric esters, which can also be crosslinked. The degree of oligomerization is about 2 to about 100, preferably 2 to 20. The mixture can also comprise compounds having ether functions, which are formed by the crosslinking of two THEIC units.

Component B of the flameproofing system is accordingly derived from a) units of the formula I

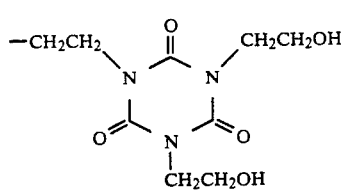

b) units of the formula II

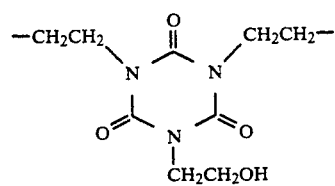

c) units of the formula III

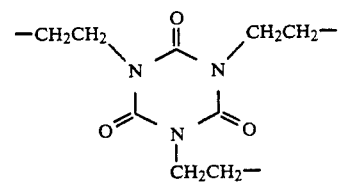

and d) units of the formula IV

in which Ar is a mono-, di- or trinuclear aromatic six-membered ring system and m is 2, 3 or 4.

Suitable polycarboxylic acids are, for example, phthalic acid, isophthalic acid, terephthalic acid, 1,3,5-benzenetricarboxylic acid, 1,2,4-benzenetricarboxylic acid, pyromellitic acid, mellophanic acid, prehnitic acid, 1-naphthoic acid, 2-naphthoic acid, naphthalenedicarboxylic acids and anthracenecarboxylic acids.

Component B is prepared by reaction of the tris(hydroxyethyl) isocyanurate with the acids, their alkyl esters or their halides in accordance with the following example:

THEIC ethylenediaminetetraacetic acid ester (for Comparison Example B)

30 g (0.88 mol) of tris(2-hydroxyethyl) isocyanurate (THEIC) were melted at 150° C. After addition of 1.5 g of titanium tetrabutylate and 62 g (0.22 mol) of ethylenediaminetetraacetic acid, the vigorously stirred mixture was heated at 200° to 210° C. for about 3 hours, during which 16.5 g of water (92% of theory) were to be condensed. After the melt had cooled and been subsequently ground, a beige powder having a melting range from 65° to 80° C. was obtained. The residual acid number was 13 mg of KOH/g.

THEIC nitrilotriacetic acid ester (for Comparison Example C)

261 g (1.0 mol) of THEIC were melted at 150° C. After addition of 1.5 g of titanium tetrabutylate and 63 g (0.33 mol) of nitrilotriacetic acid, the vigorously stirred mixture was heated at 180° to 190° C. for about 3 hours, during which 17 g of water (94.5% of theory)

were to be condensed. After the melt had cooled and been subsequently ground, a pale yellow powder having a melting range from 65° to 80° C. was obtained. The residual acid number was 10 mg of KOH/g.

THEIC maleic acid ester (for Comparison Example D)

261 g (1.0 mol) of THEIC were melted at 150° C. After addition of 1.5 g of titanium tetrabutylate and 49 g (0.5 mol) of maleic anhydride, the vigorously stirred mixture was heated from 190° C. to 230° C. in the course of 4 hours, during which 8.8 g of water (98% of theory) were to be condensed. After the melt had cooled and been subsequently ground, a white powder having a melting range from 70 to 80% was obtained. The residue acid number was 6 mg of KOH/g.

THEIC terephthalic acid ester 979 g (3.76 mol) of THEIC were melted at 150° C. After addition of 2.6 g of titanium tetrabutylate and 311.4 g (1.86 mol) of terephthalic acid, the vigorously stirred mixture was heated from 190° C. to 230° C. in the course of 7 hours, during which 66 g of water (97.5% of theory) were to be condensed. After the melt had cooled and been subsequently ground, a white powder having a melting range from 80° to 90° C. was obtained. The residual acid number was 11 mg of KOH/g.

THEIC terephthalic acid ester 979 g (3.76 mol) of THEIC were melted at 150° C. After addition of 4.1 g of titanium tetrabutylate and 373.7 g (2.25 mol) of terephthalic acid, the vigorously stirred mixture was heated from 190° C. to 230° C. in the course of 4 hours, during which 77 g of water (95% of theory) were to be condensed. After the melt had cooled and been subsequently ground, a white powder having a melting range from 90° to 105° C. was obtained. The residual acid number was 8 mg of KOH/g.

THEIC terephthalic acid ester 861 g (3.3 mol) of THEIC were melted at 150° C. After addition of 3.7 g of titanium tetrabutylate and 383.7 g (2.3 mol) of terephthalic acid, the vigorously stirred mixture was heated from 190° C. to 230° C. in the course of 8 hours, during which 80 g of water (96% of theory) were to be condensed. After the melt had cooled and been subsequently ground, a white powder having a melting range from 100° to 120° C. was obtained. The residual acid number was 6 mg of KOH/g.

The flameproofing system comprises 80 to 50% by weight of component A and 20 to 50% by weight of component B.

In addition to the flameproofing system, the plastics molding composition according to the invention can also comprise the following additives:

1. Antioxidants, for example alkylated monophenols, alkylated hydroquinones, hydroxylated thiodiphenyl ethers, alkylidene-bisphenols, benzyl compounds, acylaminophenols, esters of $\beta$-(3,5-di-t-butyl-4-hydroxy-phenyl)-propionic acid with mono- or polyhydric alcohols, such as, for example, with methanol, diethylene glycol, octadecanol, triethylene glycol, 1,6-hexanediol, pentaerythritol, neopentylglycol, tris-hydroxyethyl isocyanurate, thiodiethylene glycol or di-hydroxyethyl oxalic acid diamide, esters of $\beta$-(5-t-butyl-4-hydroxy-3-methylphenyl)-propionic acid with mono- or polyhydric alcohols, such as, for example, with methanol, diethylene glycol, octadecanol, triethylene glycol, 1,6-hexanediol, pentaerythritol, neopentyl glycol, tris-hydroxyethyl isocyanurate, thiodiethylene glycol or di-hydroxyethyl-oxalic acid diamide, and amides of $\beta$-(3,5-di-t-butyl-4-hydroxyphenyl)-propionic acid.

2. UV absorbers and light stabilizers 2.1 2-(2,'-Hydroxyphenyl)-benzotriazoles, such as, for example, the 5'-methyl, 3',5'-di-t-butyl, 5'-t-butyl, 5'-(1,1,3,3-tetramethylbutyl), 5-chloro-3',5'-di-t-butyl, 5-chloro-3'-t-butyl-5'-methyl, 3'-sec-butyl-5'-t-butyl, 4'-octoxy, 3,5'-di-t-amyl or 3',5'-bis($\alpha,\alpha$-dimethyl-benzyl) derivative.

2.2 2-Hydroxybenzophenones, for example the 4-hydroxy, 4-methoxy, 4-octoxy, 4-decyloxy, 4-dodecyloxy, 4-benzyloxy, 4,2',4'-trihydroxy or 2'-hydroxy-4,4-dimethoxy derivative.

2.3 Esters of optionally substituted benzoic acids, for example 4-t-butyl-phenyl salicylate, phenyl salicylate, octylphenyl salicylate, dibenzoylresorcinol, bis(4-t-butylbenzoyl)resorcinol, benzoylresorcinol, 2,4-di-t-butylphenyl 3,5-di-t-butyl-4-hydroxybenzoate and hexadecyl 3,5-di-t-butyl-4-hydroxybenzoate 2.4 Acrylates, for example ethyl and iso-octyl $\alpha$-cyano-$\beta,\beta$-diphenylacrylate, methyl $\alpha$-carbomethoxycinnamate, methyl and butyl $\alpha$-cyano-$\beta$-methyl-p-methoxycinnamate, methy $\alpha$-carbomethoxy-p-methoxycinnamate and N-($\beta$-carbomethoxy-9-cyano-vinyl)-2-methyl-indoline 2.5 Nickel compounds, for example nickel complexes of 2,2,'-thio-bis-[4-(1,1,3,3-tetramethyl-butyl)-phenols], such as the 1:1 or 1:2 complex, optionally with additional ligands, such as N-butylamine, triethanolamine and N-cyclohexyl-diethanolamine, nickel alkyl-dithiocarbamates, nickel salts of 4-hydroxy-3,5-di-t-butylbenzylphosphonic acid monoalkyl esters, such as of the methyl or ethyl ester, nickel complexes of ketoximes, such as of 2-hydroxy-4-methyl-phenyl undecyl ketoxime, nickel complexes of 1-phenyl-4-lauroyl-5-hydroxypyrazole, optionally with additional ligands, and nickel salts of 2-hydroxy-4-alkoxybenzophenones.

2.6 Sterically hindered amines, for example 2.6.1 bis ( 2,2,6,6-tetramethylpiperidyl ) sebacate, bis-( 1,2,2,6,6-pentamethylpiperidyl) sebacate, bis- ( 2,2,6,6-tetramethylpiperidyl)-glutarate, bis-(1,2,2,6,6-pentamethylpiperidyl)-glutarate, bis-(2,2,6,6-tetramethylpiperidyl)-succinate, bis-(1,2,2,6,6-pentamethylpiperidyl)-succinate, 4-stearyloxy-2,2,6,6-tetramethylpiperidine, 4-stearyloxy- 1,2,2,6,6-pentamethylpiperidine, 4-stearoyloxy-2,2,6,6-tetramethylpiperidine, 4-stearyloxy-1,2,2,6,6-pentamethylpiperidine, 2,2,6,6-tetramethylpiperidyl behenate, 1,2,2,6,6-pentamethylpiperidyl behenate, 2,2,4,4-tetramethyl-7-oxa-3,20-diazadispiro[5.1.11.2]-heneicosan-21-one, 2,2,3,4,4-pentamethyl-7-oxa-3,20-diazadispiro [5.1.11.2]-heneicosan-21-one, 2,2,4,4-tetramethyl-3-acetyl-7-oxy-3,20-diaza-dispiro-[5.1.11.2]-21-one, 2,2,4,4-tetramethyl-7-oxa-3,20-diaza-20-($\beta$-lauryloxy-carbonylethyl)-21-oxo-dispiro-[5.1.11.2]-heneicosane, 2,2,3,4,4-pentamethyl-7-oxa-3,20-diaza-20- ($\beta$-lauryloxy-carbonylethyl )-21-oxo-dispiro[5 .1.11.2]-heneicosane, 2,2,4,4-tetramethy-3-acetyl-7-oxa-3,20-diazo-20- ($\beta$-lauryloxy-carbon -oxadispiro-[5.1.11.2]-heneicosane. 1,1', 3,3',5,5'-hexahydro-2,2',4,4',6,6'-hexaaza-2,2',6,6'-bismethano-7,8-dioxo-4,4'-bis-(1,2,2,6,6- pentamethyl-4-piperidyl)-bisphenyl, N,N',N'',N'''-tetrakis-[2,4-bis-[N-(2,2,6,6-tetramethyl-4-piperidyl)-butylamino]-1,3,5-triazin-6-yl]-4,7-diazadecane-1,10-diamine, N,N',N'',N'''-tetrakis[2,4-bis-[N-(1,2,2,6,6-pentamethyl-4-piperidyl)-butylamino]-1,3,5-triazin-6-yl]-4,7-diazadecane-1,10-diamine, N,N',N'',N'''-tetrakis-[2,4-bis-[N-(2,2,6,6-tetramethyl-4-piperidyl)-methoxy-propylamino]-1,3,5-triazin -6-yl]-4,7-diazadecane, 1,10-diamine, N,N',N'',N'''-tetrakis-[2,4-bis-[N-(1,2,2,6,6-pentamethyl-4-piperidyl)-methoxy-propylamino]-1,3,5-triazin-6-yl]-4,7-diazadecane, 1,10-diamine, bis-(1,2,2,6,6-pentamethyl-piperidyl)-n-butyl-3,5-di-t-butyl-4-hydroxy-benzylmalonate, tris-(2,2,6,6-tetramethyl-4-piperidyl)-nitrilotriacetate, tetrakis-(2,2,6,6-tetramethyl-4-piperidyl)-1,2,3,4-butanetetracarboxylic acid and 1,1'-(1,2-ethanediyl)-bis-(3,3,5,5-tetramethylpiperazinone).

2.6.2 Poly-N,N'-bis(2,2,6,6-tetramethyl-4-piperidyl)-1,8-diazadecylene, condensation product of 1-(2-hydroxyethyl)-2,2,6,6-tetramethyl-4-hydroxy-piperidine and succinic acid, the condensation product of N,N'-bis(2,2,6,6-tetramethyl-4-piperidyl)-hexamethylenediamine and 4-t-octylamino-2,6-dichloro-1,3,5-triazine and the condensation product of N,N'-bis-(2,2,6,6-tetramethyl-4-piperidyl)-hexamethylenediamine and 4-morpholino-2,6-dichloro-1,3,5-triazine.

2.7 Oxalic acid diamides, for example 4,4'-dioctyloxy-oxanilide, 2,2-di-octyloxy-5,5'-di-t-butyl-oxanilide, 2,2'-didodecyloxy-5,5'-di-t-butyonilide, 2-ethoxy-2'-ethyloxanilide N,N'-bis-(3-dimethylaminopropyl)-oxalamide, 2-ethoxy-5-t-butyl-2'-ethyloxanilide and its mixture with 2-ethoxy-2'-ethyl-5,4-di-t-butyl-oxanilide, and mixtures of o- and p-methoxy- and of o- and p-ethoxy-disubstituted oxanilides.

3. Metal deactivators, for example N,N''-diphenyloxalic acid diamide, N-salicylyl-N'''-salicyloyl-hydrazine, N,N'-bis-salicyloyl-hydrazine, N,N'-bis-(3,5-di-t-butyl-4-hydroxyphenylpropionyl)-hydrazine, 3-salicyloylamino- 1,2,3-triazole and bis-benzylidene-oxalic acid dihydrazide.

4. Phosphites and phosphonites, for example triphenyl phosphite, diphenyl alkyl phosphites, phenyl dialkyl phosphites, trisnonylphenyl phosphite, trilauryl phosphite, trioctadecyl phosphite, distearyl pentaerythrityl diphosphite, tris-(2,4-di-t-butylphenyl) phosphite, diisodecyl pentaerythrityl diphosphite, bis-(2,4-di-t-butylphenyl) pentaerythrityl diphosphite, tristearyl sorbityl triphosphite, tetrakis-(2,4-di-t-butylphenyl) 4,4'-biphenylene diphosphonite, 3,9-bis-(2,4-di-t-butylphenoxy)-2,4,8,10-tetraoxa-3,9-diphosphaspiro-[5.5]-undecane and tris-(2-t-butyl-4-thio-(2'-methenyl-4'-hydroxy-5'-t-butyl)-phenyl-5-methenyl)-phenyl phosphite.

5. Compounds which destroy peroxide, for example esters of β-thio-dipropionic acid, such as, for example, the lauryl, stearyl, myristyl or tridecyl ester, mercaptobenzimidazole, the zinc salt of 2-mercaptobenzimidazole, zinc alkyl-dithiocarbamates, dioctadecyl sulfide, dioctadecyl disulfide and pentaerythritol tetrakis-(β-dodecylmercapto)-propionate 6. Basic costabilizers, for example melamine, polyvinylpyrrolidone, dicyandiamide, triallyl cyanurate, urea derivatives, hydrazine derivatives, amines, polyamines, polyurethanes, alkali metal and alkaline earth metal salts of higher fatty acids or phenolates, for example Ca stearate, Zn stearate, Mg stearate, Na ricinoleate, K palmitate, antimony pyrocatecholate, or tin pyrocatecholate, and hydroxides and oxides of alkaline earth metals or of aluminum, for example CaO, MgO and ZnO.

7. Nucleating agents, for example 4-t-butylbenzoic acid, adipic acid, diphenylacetic acid and dibenzylidenesorbitol.

8. Fillers and reinforcing agents, for example calcium carbonate, silicates, glass fibers, asbestos, talc, kaolin, mica, barium sulfate, metal oxides and hydroxides, carbon black and graphite 9. Other additives, for example plasticizers, lubricants, emulsifiers, pigments, optical brighteners, antistatics and blowing agents.

The various additional additives of the abovementioned groups 1 to 7 are added to the polymers to be stabilized in an amount of 0.01 to 10, preferably 0.01 to 5% by weight, based on the total weight of the molding composition. The proportion of additives of groups 8 and 9 is 1 to 80, preferably 10 to 50% by weight, based on the total molding composition.

The additives are incorporated into the organic polymers by generally customary methods. The incorporation can be effected, for example, by a procedure in which the compounds and if appropriate other additives are mixed into or applied to the polymers directly after the polymerization or in the melt, before or during shaping. The incorporation can also be effected by application of the dissolved to dispersed compounds to the polymer directly, or mixing of them into a solution, suspension or emulsion of the polymer, if appropriate with subsequent evaporation of the solvent- The compounds are also effective if they are subsequently introduced into an already granulated polymer in a separate processing step.

The compounds to be used according to the invention can also be added in the form of a masterbatch, which contains these compounds, for example, in a concentration of 30 to 90, preferably 50 to 80% by weight, to the polymers to be provided with a flame-retardant treatment.

The plastics molding composition according to the invention can be used in various forms, for example as films, fibers, tapes or profiles provided with a flame-retardant treatment.

As a result of the flameproofing system to be employed according to the invention, both the processing temperature of the plastics molding composition is increased, and the water-solubility of components of the molding composition after processing is reduced considerably. Furthermore, the components of plastic which have been provided with a flame-retardant treatment show a reduced tendency to "exude" constituents of the flameproofing system.

The examples and tables which follow are intended to illustrate the invention in more detail.

A polypropylene having a melt flow index MFI 230/5 of 55 g/10 minutes (•Hostalen PPU 0180, Hoechst) was employed for preparation of the flame-retardant plastics molding compositions. The ammoniumpolyphosphate used was a commercially obtainable product having a value for n of about 700 (•Exolit 422, Hoechst). Processing was carried out by mixing the components in a fluid mixer and extruding the mixture in a single-screw extruder (30 mm screw diameter, 60 mm length) at a temperature of 230 to 280° C. During the extrusion, the melt temperature was increased stepwise by 5 or 10° C. per half hour. The intake properties of the mixture and quality of the extruded strand were checked. The limiting temperature stated in the examples was reached when the polymer strand foamed visibly or broke off repeatedly due to non-uniform, intake of the mixture. The polymer strand was granulated using a granulator. The granules prepared in this manner were then molded on an injection molding machine at 220 to 250° C. to give test specimens of 127 mm length, 12.7 mm width and 1.6 mm thickness.

The burning properties of the test specimens were determined in accordance with the UNDERWRITERS LABORATORIES specification: "Test for Flammability of Plastic Material—UL 94" (version of 2nd May 1975). The indication "n.c." in the tables means "not classifiable according to UL 94".

The weighted test specimens were stored in water in a stirred bath controlled at a temperature of 23° C. After 30 days, the test specimens were first dried at 80° C. for 48 hours then weighed again.

The following polycarboxylic acid esters were employed as component B in the examples:

| Example | |
|---|---|
| A (comparison) | tris (2-hydroxyethyl) isocyanurate (THEIC) |
| B (comparison) | THEIC ethylenediaminetetraacetic acid ester |
| C (comparison) | THEIC nitrilotriacetic acid ester |
| D (comparison) | THEIC maleic acid ester |
| 1 | THEIC terephthalic acid ester, monomeric |
| 2 | THEIC terephthalic acid ester, dimer/trimer mixture |
| 3 | THEIC terephthalic acid ester, tetramer |
| 4 | as Example 3. |

The test results are summarized in the table.

TABLE

| | Example | | | | | | | |
|---|---|---|---|---|---|---|---|---|
| | A | B | C | D | 1 | 2 | 3 | 4 |
| Polypropylene [% by weight] | 72 | 72 | 72 | 72 | 72 | 72 | 72 | 72 |
| Component A [% by weight] | 20.7 | 20.7 | 20.7 | 20.7 | 20.7 | 20.7 | 20.7 | 19.4 |
| Component B [% by weight] | 5.1 | 5.1 | 5.1 | 5.1 | 5.1 | 5.1 | 5.1 | 6.5 |
| Standard additives [% by weight] | 0.2 | 0.2 | 0.2 | 0.2 | 0.2 | 0.2 | 0.2 | 0.2 |
| Limiting temperature during processing [°C.] | 245 | 245 | 255 | 240 | 275 | 280 | 280 | 285 |
| UL 94 vertical test | V-0 | V-0 | V-0 | V-0 | V-0 | V-0 | V-2 | V-0 |
| Weight loss on storage in water at 23° C. for 30 days | 7 | 8.9 | 8.0 | 6.6 | 0.6 | 0.4 | 0.2 | 0.2 |
| UL 94 vertical test after storage in water | V-2 | n.c. | n.c. | n.c. | V-2 | V-0 | V-2 | V-0 |

Exudation of constituents of the flameproofing system was not to be observed.

We claim:

1. A flame-retardant plastics molding composition comprising 50 to 85% by weight, based on the total amount of molding composition, of an olefin polymer and 15 to 50% by weight, based on the total amount of the molding composition, of a flameproofing system comprising 80 to 50% by weight of an ammonium polyphosphate of the formula $(NH_4PO_3)_n$, in which n is a number from 200 to 1000 (=component A), and 50 to 20% by weight of a compound (=component B) comprising a) units of the formula I

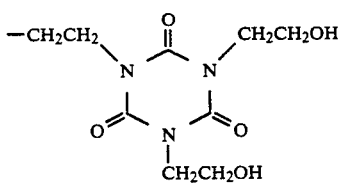

b) units of the formula II

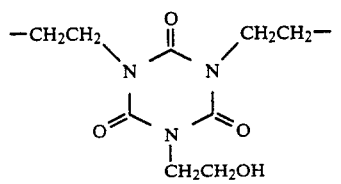

c) units of the formula III

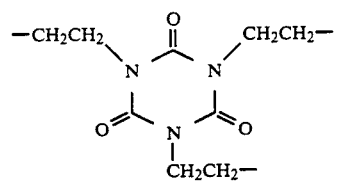

and d) units of the formula IV

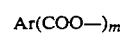

$$Ar(COO-)_m \qquad (IV)$$

in which Ar is a mono-, di- or trinuclear aromatic six-membered ring system and m is 2, 3 or 4.

2. A molding composition as claimed in claim 1, wherein the olefin polymer is a poly-1-olefin or polyethylene.

3. A molding composition as claimed in claim 1, wherein the olefin polymer is polypropylene.

4. A molding composition as claimed in claim 1, wherein the ammonium polyphosphate, which is said component A of the flameproofing system, comprises a coated powder in which the powder particles are covered with 0.5 to 25%, based on the weight of the powder, of a coating agent.

5. A process for the preparation of a flame-retardant plastics molding composition comprising
60 to 85% by weight, based on the total amount of the molding composition, of an olefin polymer and
15 to 40% by weight, based on the total amount of the moulding composition, of a flameproofing system,
by mixing the constituents, which comprises admixing, at a temperature exceeding 250° C.,
to the olefin polymer a flameproofing system comprising
80 to 50% by weight of an ammonium polyphosphate of the formula $(NH_4PO_3)_n$, in which n is a number from 200 to 1000 (=component A), and
50 to 20% by weight of a compound (=component B) comprising
a) units of the formula I

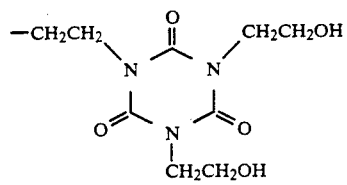

b) units of the formula II

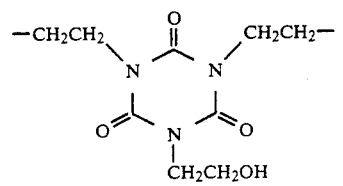

c) units of the formula III

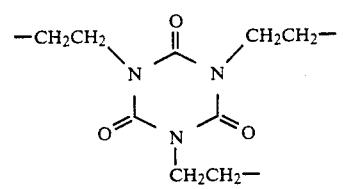

and
d) units of the formula IV $$Ar(COO-)_m \qquad (IV)$$

in which Ar is a mono-, di- or trinuclear aromatic six-membered ring system and m is 2, 3 or 4.

6. A molding composition as claimed in claim 1, wherein the olefin polymer is polyethylene.

7. A molding composition as claimed in claim 1, wherein the olefin polymer is present in an amount of 80–60% by weight of the composition, and the flameproofing system is present in an amount of 20–40% by weight of the composition.

8. A molding composition as claimed in claim 1, wherein n is about 700.

9. A molding composition as claimed in claim 1, wherein the olefin polymer is an ethylene/vinyl acetate copolymer.

10. A molding composition as claimed in claim 1, wherein the olefin polymer is polystyrene or poly(p-methylstyrene).

11. A fire-retardant molded article obtained from a molding composition as claimed in claim 1.

12. A method for the production of a fire-retardant molded article comprising the step of molding a composition as claimed in claim 1.

13. A method as claimed in claim 12, wherein said composition is injection-molded at a temperature which exceeds 250° C. at some time during the injection molding step.

14. A fire-retardant moldable masterbatch suitable for incorporation into a flame-retardant, plastics molding composition, said masterbatch comprising:
30 to 90% by weight, based on the total masterbatch composition, of a flameproofing system comprising
A. 80 to 50% by weight of an ammonium polyphosphate of the formula $(NH_4PO_3)_n$, in which n is a number from 200 to 1000, and
B. 50 to 20% by weight of an aromatic carboxylic acid ester of tris(2-hydroxyethyl) isocyanurate containing mono-, di-, and tri-esterified units, the aromatic carboxylic acid residues of said units having the formula $$Ar(COO-)_m$$

in which Ar is a mono-, di- or tri-nuclear aromatic six-membered ring system and m is 2, 3 or 4,
the balance of said masterbatch composition consisting essentially of an olefin polymer.

15. The fire-retardant moldable masterbatch composition as claimed in claim 14, wherein the amount of said flameproofing system is 50 to 80% by weight, based on the weight of the masterbatch.

* * * * *